(12) United States Patent
Wang et al.

(10) Patent No.: US 10,801,475 B2
(45) Date of Patent: Oct. 13, 2020

(54) MULTI-BUFFERING ENERGY STORAGE DEVICE AND APPLICATION THEREOF

(71) Applicant: SHANDONG UNIVERSITY OF SCIENCE AND TECHNOLOGY, Qingdao (CN)

(72) Inventors: Chenglong Wang, Qingdao (CN); Zhiwei Qiu, Qingdao (CN); Qingliang Zeng, Qingdao (CN); Meng Chen, Qingdao (CN); Zhihai Liu, Qingdao (CN); Shumeng Ma, Qingdao (CN); Yue Wang, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 16/345,673

(22) PCT Filed: Nov. 10, 2017

(86) PCT No.: PCT/CN2017/110365
§ 371 (c)(1),
(2) Date: Apr. 26, 2019

(87) PCT Pub. No.: WO2018/133508
PCT Pub. Date: Jul. 26, 2018

(65) Prior Publication Data
US 2019/0242368 A1 Aug. 8, 2019

(30) Foreign Application Priority Data

Jan. 22, 2017 (CN) .................. 2017 1 00477067

(51) Int. Cl.
*F03G 1/00* (2006.01)
*F03G 1/02* (2006.01)
(Continued)

(52) U.S. Cl.
CPC ................ *F03G 1/02* (2013.01); *F03G 1/06* (2013.01); *F03G 1/08* (2013.01); *F15B 1/24* (2013.01);
(Continued)

(58) Field of Classification Search
CPC ..... F03G 1/02; F03G 1/06; F03G 1/08; F03G 2730/01; F16H 48/06; F15B 1/24;
(Continued)

(56) References Cited

U.S. PATENT DOCUMENTS 2,524,005 A * 9/1950 Boe ...................... H02K 7/1853
290/1 E
3,732,949 A * 5/1973 Williams .................. F03G 1/00
185/40 R
(Continued)

*Primary Examiner* — Julio C. Gonzalez
(74) *Attorney, Agent, or Firm* — CBM Patent Consulting, LLC

(57) ABSTRACT

A multi-buffer energy accumulation apparatus comprises: an energy storage cylinder, an oil tank, a first scroll spring mechanism, a second scroll spring mechanism, a hydraulic motor, differential planetary train of gearings, and a generator; wherein the energy storage cylinder comprises a hermetically sealed cylinder body, one end of the hermetically sealed cylinder body being provided with an elastic mobile device, the other end thereof being provided with an energy transmission device, and hydraulic oil is filled in the hermetically sealed cylinder body between the elastic mobile device and the energy transmission device; the hermetically sealed cylinder body, the hydraulic motor, and the oil tank are connected via an oil circuit to form a hydraulic loop; the energy transmission device is connected with the first scroll mechanism; the hydraulic motor is connected with the second scroll spring mechanism.

10 Claims, 4 Drawing Sheets

(51) Int. Cl.
*F03G 1/08* (2006.01)
*F15B 1/24* (2006.01)
*H02K 7/02* (2006.01)
*H02K 7/18* (2006.01)
*H02K 7/116* (2006.01)
*H02K 7/14* (2006.01)
*F03G 1/06* (2006.01)
*F16H 48/06* (2006.01)

(52) U.S. Cl.
CPC .............. *H02K 7/02* (2013.01); *H02K 7/116* (2013.01); *H02K 7/14* (2013.01); *H02K 7/1807* (2013.01); *H02K 7/1853* (2013.01); *F03G 2730/01* (2013.01); *F15B 2201/31* (2013.01); *F16H 48/06* (2013.01)

(58) Field of Classification Search
CPC ...... F15B 2201/31; F15B 7/003; F15B 7/008; F15B 7/08; H02K 7/02; H02K 7/116; H02K 7/14; H02K 7/1807; H02K 7/1853
See application file for complete search history.

(56) References Cited

U.S. PATENT DOCUMENTS

| | | | | |
|---|---|---|---|---|
| 4,020,923 | A * | 5/1977 | Taylor | F03G 1/00 185/11 |
| 4,287,428 | A * | 9/1981 | Smith | H02J 7/14 185/11 |
| 5,590,741 | A * | 1/1997 | Storms | F03G 1/08 185/10 |
| 5,909,784 | A * | 6/1999 | Best | F03G 1/00 185/10 |
| 6,199,664 | B1 * | 3/2001 | Tkaczyk | F03G 1/00 185/37 |
| 7,009,350 | B1 * | 3/2006 | Gold | H02P 9/48 290/1 A |
| 7,834,471 | B2 * | 11/2010 | Cripps | F03G 1/02 290/1 A |
| 2003/0042807 | A1 * | 3/2003 | Blake | H02K 53/00 310/66 |
| 2014/0353976 | A1 * | 12/2014 | Andujar | F15B 1/265 290/54 |
| 2016/0164373 | A1 * | 6/2016 | Liao | H02K 7/003 290/50 |

\* cited by examiner

MULTI-BUFFERING ENERGY STORAGE DEVICE AND APPLICATION THEREOF

FIELD

The present disclosure relates to the field of energy conversion and reutilization, and more particularly to a multi-buffer energy accumulation apparatus and applications thereof.

BACKGROUND

At present, conventional accumulators fall into the following categories in terms of their loading manners: spring-loaded accumulators, weight-loaded accumulators, gas-charged accumulators; however, these accumulators only have limited energy storage means, such that energy fails to be stored for further utilization.

For example, Chinese Patent Literature CN204037271U discloses an energy recoverable hydro pneumatic suspension, comprising a hydraulic cylinder, an accumulator, and a pipeline in communication with a rodless cavity of the hydraulic cylinder and with the accumulator; wherein the hydraulic motor is arranged in the pipeline, and the generator is in transmission connection with the hydraulic motor. In that patent, a controllable energy recovery device is additionally provided to an energy recovery hydro pneumatic suspension of a suspension system, such that the suspension system has an energy recovery function, which ameliorates vehicle fuel economy to a certain extent. However, the energy recovery device cannot realize energy storage and accumulation; besides, the hydraulic cylinder has no function of automatic reset.

SUMMARY

In view of the drawbacks in the prior art, the present disclosure provides a multi-buffer energy accumulation apparatus.

The present disclosure further provides a working method for the multi-buffer energy accumulation apparatus.

A technical solution of the present disclosure is provided below:

A multi-buffer energy accumulation apparatus comprises: an energy storage cylinder, an oil tank, a first scroll spring mechanism, a second scroll spring mechanism, a hydraulic motor, a differential planetary train of gearings, and a generator;

the energy storage cylinder comprises a hermetically sealed cylinder body, one end of the hermetically sealed cylinder body being provided with an elastic mobile device, the other end thereof being provided with an energy transmission device, wherein repellent magnetic forces are present between the elastic mobile device and the energy transmission device, and hydraulic oil is filled in the hermetically sealed cylinder body between the elastic mobile device and the energy transmission device;

the hermetically sealed cylinder body, the hydraulic motor, and the oil tank are connected via an oil circuit to form a hydraulic loop; the energy transmission device is connected with the first scroll spring mechanism; the hydraulic motor is connected with the second scroll spring mechanism, wherein the first scroll spring mechanism and the second scroll spring mechanism are connected to the generator via the differential planetary train of gearings.

Preferably, the elastic mobile device comprises, a piston rod, a piston rod head, a reset spring, a piston, a magnet wheel, and a piston permanent-magnet, wherein the piston is arranged in the hermetically sealed cylinder body, the magnet wheel is disposed inside the piston and is connected to one end of the piston rod; the piston permanent-magnet is arranged on a circumferential direction of the magnet wheel; the other end of the piston rod is through the hermetically sealed cylinder body and the reset spring successively and then connected with the piston rod head.

Preferably, the energy transmission device comprises a magneto dynamic output shaft, a cylinder bottom permanent-magnet, and a separation barrier, wherein one end of the magneto dynamic output shaft being arranged inside the hermetically sealed cylinder body, the cylinder bottom permanent-magnet is arranged on a circumferential direction of the magneto dynamic output shaft, the other end of the magneto dynamic output shaft passes out of the hermetically sealed cylinder body, the separation barrier is disposed inside the hermetically sealed cylinder body and between the energy transmission device and the elastic mobile device, and opposite sides of the cylinder bottom permanent-magnet and the piston permanent-magnet have a same polarity.

Preferably, the piston permanent-magnet is disposed to tilt upwardly with an included angle on a circumferential direction of the magnet wheel; and the cylinder bottom permanent-magnet is disposed to tilt upwardly with an included angle on a circumferential direction of the magneto dynamic output shaft, wherein the included angle of the piston permanent-magnet is identical to that of the cylinder bottom permanent-magnet.

Preferably, the first scroll spring mechanism and the differential planetary train of gearings are connected via a train of gearings, a sprocket mechanism or a band wheel mechanism.

Preferably, the first scroll spring mechanism and the second scroll spring mechanism each comprise a scroll spring, a ratchet wheel, a ratchet, and a hydraulic cylinder, wherein a piston rod of the hydraulic cylinder is hinged with the ratchet, the ratchet is fitted with the ratchet wheel, and the ratchet wheel and the scroll spring are connected via a shaft.

Preferably, the multi-buffer energy accumulation device further comprises a fly wheel via which the differential planetary train of gearings is connected with the generator.

Preferably, the hermetically sealed cylinder body is provided with an oil inlet and an oil outlet, the oil inlet and the oil outlet being disposed between the separation barrier and the elastic mobile device, wherein the oil inlet is connected to the oil tank via the oil circuit, the oil outlet being connected to the hydraulic motor and the hydraulic cylinder via two branched oil circuits, respectively.

Preferably, an oil-in unidirectional valve is disposed on an oil circuit connecting the oil inlet with the oil tank, and an oil-out unidirectional valve is disposed on a branched oil circuit connecting the oil outlet and the hydraulic motor.

A working method for the multi-buffer energy accumulation apparatus comprises steps below:

when an impact object contacts a piston rod head, the piston rod moves and drives a piston to move; the piston extrudes hydraulic oil, causing the hydraulic oil to generate a pressure and meanwhile a reset spring to be compressed; the hydraulic oil with pressure controls, through a branched oil circuit of an oil outlet, hydraulic cylinders of a first scroll spring mechanism and a second scroll spring mechanism, such that hydraulic cylinder piston rods of the first scroll spring mechanism and second scroll spring mechanism to retract, and retraction of the hydraulic cylinder piston rods meanwhile drives a ratchet to rotate, causing the ratchet to catch a ratchet wheel;

during the piston permanent-magnet on the piston is gradually approaching a cylinder bottom permanent-magnet, under an action of same magnetic polarity repulsion, a magneto dynamic output shaft rotates and drives the first scroll spring mechanism to start energy accumulation; the hydraulic oil is compressed by the piston and flows into the hydraulic motor through the oil outlet, driving the hydraulic motor to rotate, and the hydraulic motor drives the second scroll spring mechanism to start energy accumulation;

after impact of the piston rod head disappears, the hydraulic cylinders of the first scroll spring mechanism and the second scroll spring mechanism are free from an action of the hydraulic oil, such that piston rods of the hydraulic cylinders extend out, causing the ratchet to rotate to release the ratchet wheel, scroll springs of the first scroll spring mechanism and second scroll spring mechanism release the accumulated energy, the energy being outputted by the first scroll spring mechanism and the second scroll spring mechanism to a fly wheel via a differential planetary train of gearings and finally outputted to a generator via the fly wheel.

The present disclosure has the following advantageous effects:

The multi-buffer energy accumulation apparatus according to the present disclosure may implement conversion and storage of excess energy (e.g., electrical power generated by the generator and an elastic potential energy of the scroll spring, etc.) using an energy storage cylinder, which reduces energy waste and saves resources. The energy accumulation apparatus of the present disclosure has an ingeniously designed structure and is convenient to mount and use; besides, it has a high energy conversion rate and a high storage ratio; it has an obvious and significant effect. Therefore, the present disclosure has a good economic value and social benefits.

Figure 1:
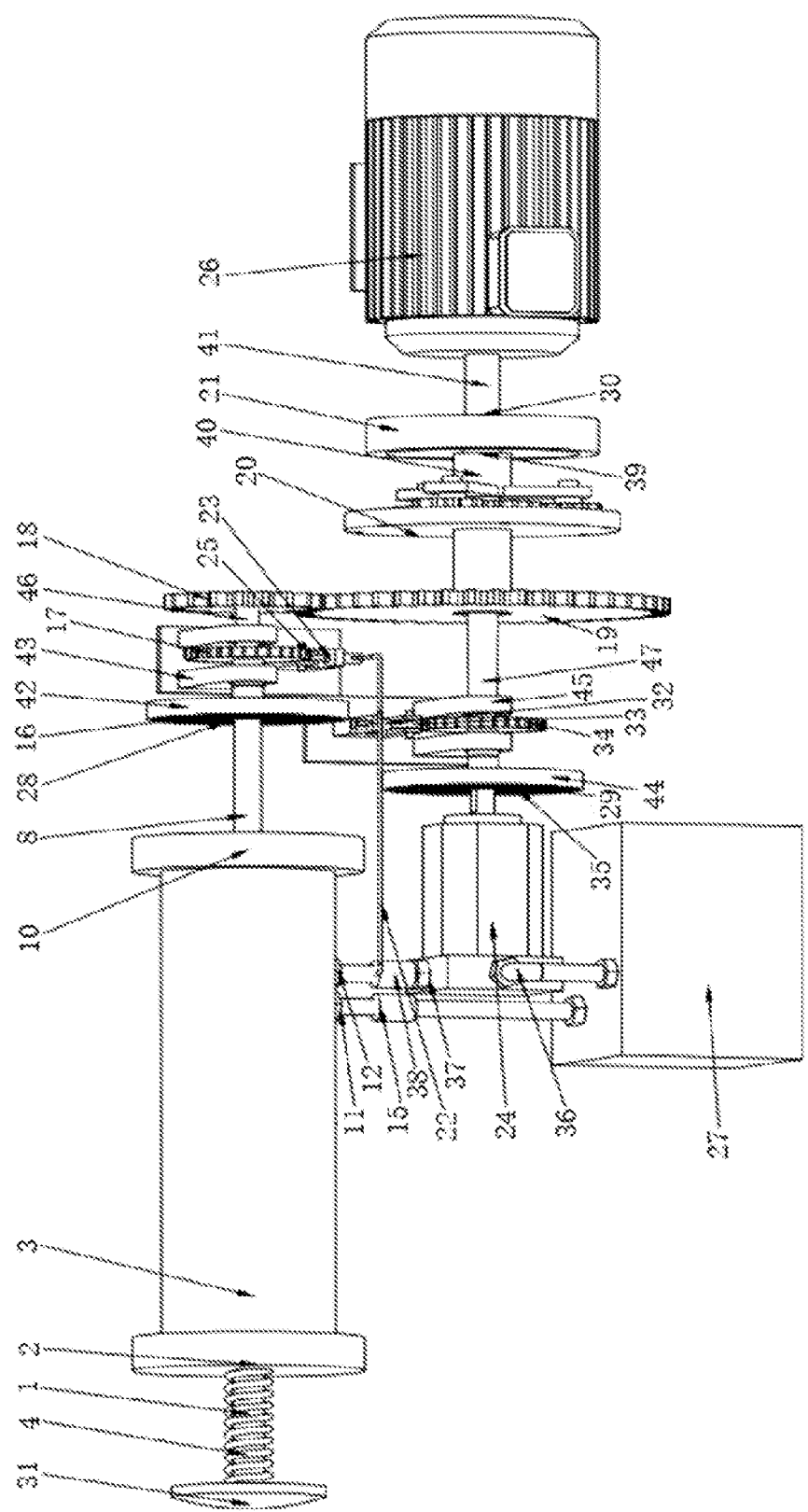
FIG. 1 is a structural schematic diagram of an energy accumulation apparatus of the present disclosure.
Figure 2:
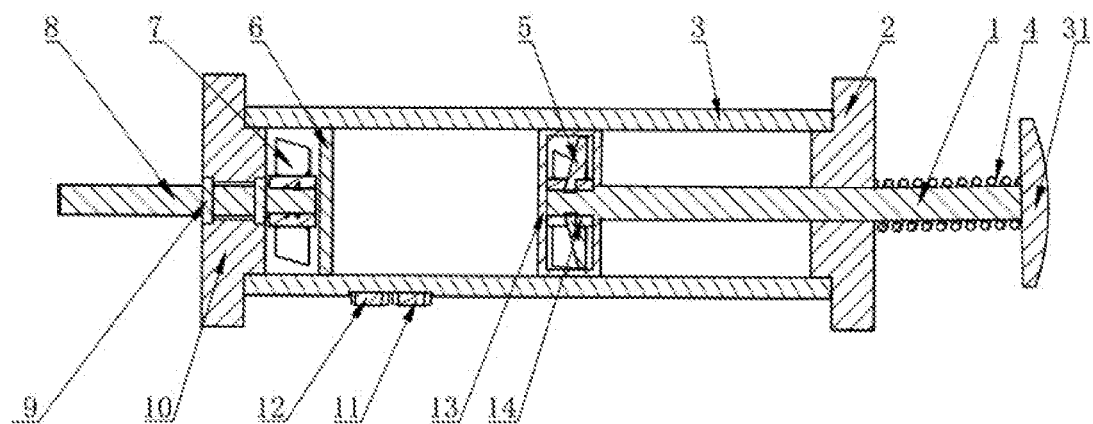
FIG. 2 is a sectional view of an energy storage cylinder.
Figure 3:
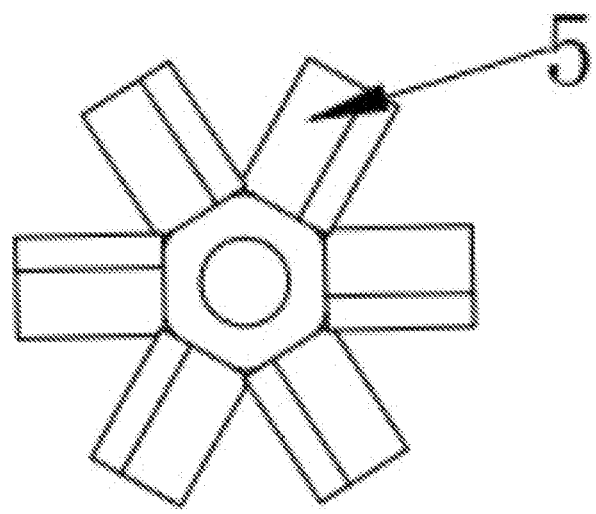
FIG. 3 is a structural schematic diagram of a piston permanent-magnet.
Figure 4:
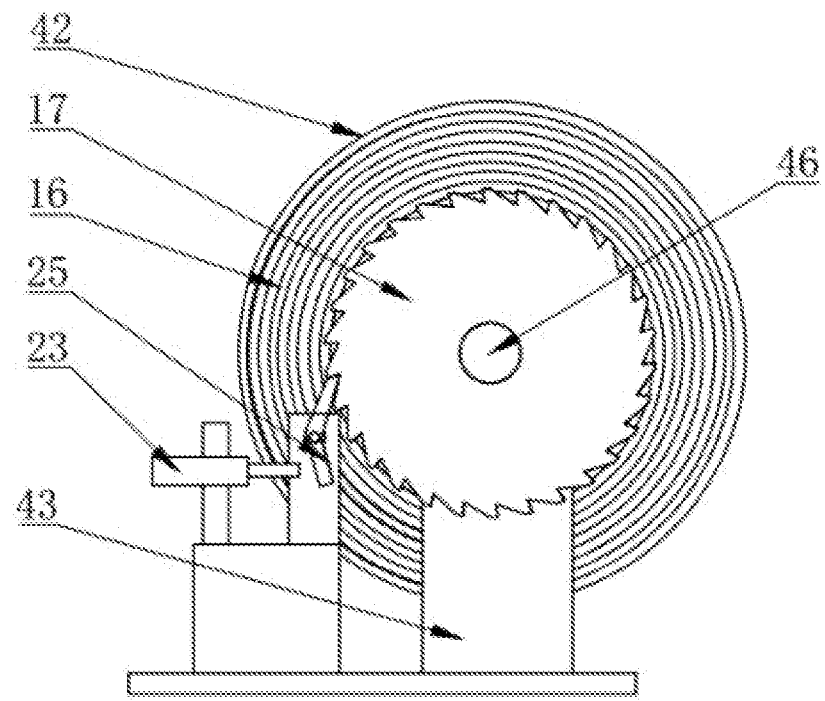
FIG. 4 is a structural schematic diagram of a first scroll spring mechanism.
Figure 5:
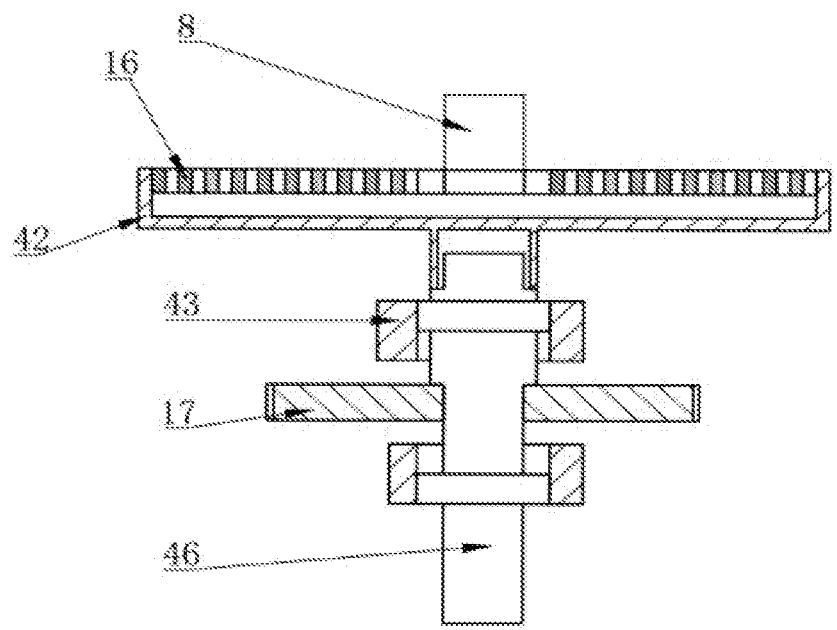
FIG. 5 is a sectional view of a first scroll spring mechanism.

wherein: 1. piston rod; 2. cylinder cap; 3. energy storage cylinder; 4. reset spring; 5. piston permanent-magnet; 6. separation barrier; 7. cylinder bottom permanent-magnet; 8. magneto dynamic output shaft; 9. bearing; 10. cylinder bottom; 11. oil inlet; 12. oil outlet; 13. piston; 14. magnet wheel; 15. oil-in unidirectional valve; 16. first scroll spring; 17. first ratchet-gear wheel; 18. magneto dynamic input pinion; 9. magneto dynamic input gear wheel; 20. differential planetary train of gearings; 21. fly wheel; 22. control oil pipe; 23. first hydraulic cylinder; 24. hydraulic motor; 25. first ratchet; 26. generator; 27. oil tank; 28. first scroll spring mechanism; 29. second scroll spring mechanism; 30. coupling; 31. piston rod head; 32. second hydraulic cylinder; 33. second ratchet; 34. second ratchet-gear wheel; 35. second scroll spring; 36. hydraulic motor oil outlet; 37. hydraulic motor oil inlet; 38. oil-out unidirectional valve; 39. unidirectional bearing; 40. fly wheel input shaft; 41. generator input shaft; 42. first scroll spring mechanism output plate; 43. first scroll spring mechanism support; 44. second scroll spring mechanism output plate; 45. second scroll spring mechanism support; 46. first scroll spring mechanism output shaft; 47. second scroll spring mechanism output shaft.

DETAILED DESCRIPTION OF EMBODIMENTS

Hereinafter, the present disclosure will be described in further detail through embodiments with reference to the accompanying drawings, but the present disclosure is not limited to these embodiments.

Embodiment 1

As shown in FIGS. 1~7, this embodiment provides a multi-buffer energy accumulation apparatus, comprising: an oil tank 27, an energy storage cylinder 3, a first scroll spring mechanism 28, a second scroll spring mechanism 29, a hydraulic motor 24, a differential planetary train of gearings 20, and a generator 26;

wherein the energy storage cylinder 3 comprises a hermetically sealed cylinder body, the hermetically sealed cylinder body comprising a cylinder barrel, a cylinder cap 2 and a cylinder bottom 10, the cylinder cap 2 and the cylinder bottom 10 being are disposed at two ends of the cylinder barrel, one end of the cylinder cap 2 being provided with an elastic mobile device, one end of the cylinder bottom 10 being provided with an energy transmission device; repellent magnetic forces are present between the elastic mobile device and the energy transmission device, and hydraulic oil is filled in the hermetically sealed cylinder body between the elastic mobile device and the energy transmission device;

wherein the hermetically sealed cylinder body, the hydraulic motor 24, and the oil tank 27 are connected via an oil circuit to form a hydraulic loop; the energy transmission device is connected with the first scroll mechanism 28; the hydraulic motor 24 is connected with the second scroll spring mechanism 29; the first scroll spring mechanism 28 and the second scroll spring mechanism 29 are connected to the generator 26 via the differential planetary train of gearings 20.

Particularly, the elastic mobile device comprises a piston rod 1, a piston rod head 31, a reset spring 4, a piston 13, a magnet wheel 14, and a piston permanent-magnet 5, wherein the piston 13 is disposed in the cylinder barrel and is provided with an empty cavity; the magnet wheel 14 is disposed in the empty cavity and connected to one end of the piston rod 1; the piston permanent-magnet 5 is arranged on a circumferential direction of the magnet wheel 14; the other end of the piston rod 1 is through the cylinder cap 2 and the reset spring 4 successively and then connected with the piston rod head 31.

Figure 6:
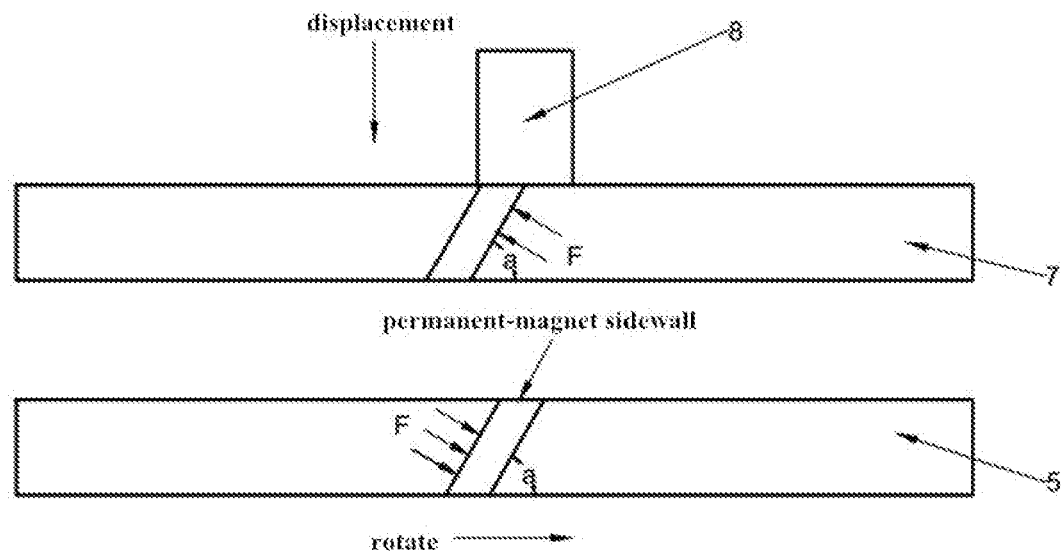
FIG. 6 is a stress schematic diagram of a piston permanent-magnet and a cylinder bottom permanent-magnet.
Figure 7:
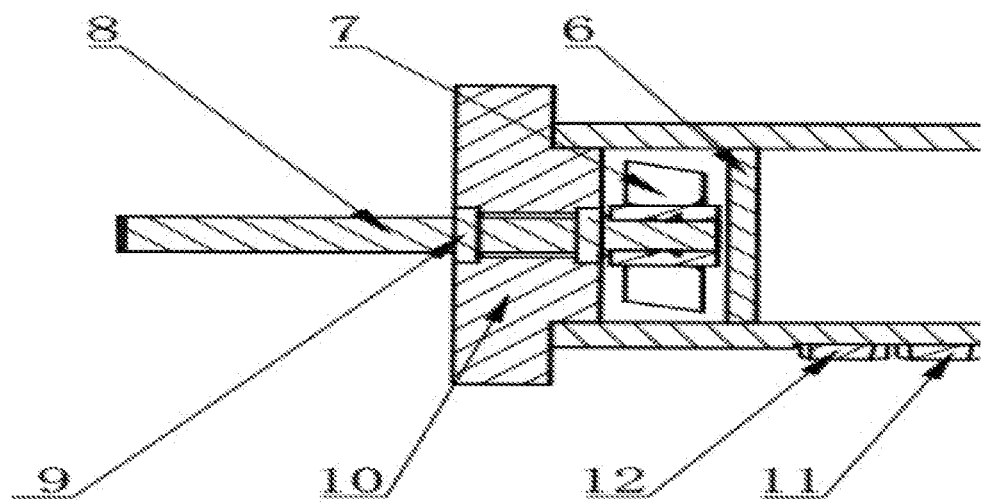
FIG. 7 is a structural schematic diagram of a cylinder bottom energy transmission device.

The energy transmission device comprises a magneto dynamic output shaft 8, a cylinder bottom permanent-magnet 7, and a separation barrier 6, wherein one end of the magneto dynamic output shaft 8 is disposed in the cylinder barrel, the cylinder bottom permanent-magnet 7 being arranged on a circumferential direction of the magneto dynamic output shaft 8, and the other end of the magneto dynamic output shaft 8 passes out of the cylinder bottom 10 and has a bearing 9 provided at a portion passing out of the cylinder bottom; the separation barrier 6 is disposed in the cylinder barrel and between the energy transmission device and the elastic mobile device; opposite sides of the cylinder bottom permanent-magnet 7 and the piston permanent-magnet 5 have a same polarity. The piston permanent-magnet 5 is disposed to tilt upwardly with an included angle on the circumferential direction of the magnet wheel 14; and the cylinder bottom permanent-magnet 7 is disposed to tilt upwardly with an included angle on the circumferential direction of the magneto dynamic output shaft 8, wherein the included angle of the piston permanent-magnet 5 is identical to that of the cylinder bottom permanent-magnet 7, both being a (as shown in FIG. 6). Then, a spinning magnetic force $F_{rotation}$ between the cylinder bottom permanent and the piston permanent-magnet is computed as follows:

$$F_{horizontal} = F \cdot \sin a$$

$$F_{vertical} = F \cdot \cos a$$

$$F_{spin} = n \cdot F_{horizontal} > F_{friction}$$

then, the cylinder bottom permanent-magnet 7 overcomes the fricative force of the bearing 9 to spin during the process in which the cylinder bottom permanent-magnet 7 is gradually approaching to the piston permanent-magnet 5;

where: F—same polarity repellent force between permanent-magnets;

a—included angle between the permanent-magnet and the piston rod axial line;

N—number of permanent magnets on the magnet wheel;

$F_{friction}$—bearing fricative force.

The first scroll spring mechanism 28 and the second scroll spring mechanism 29 are completely identical in structure and composition. The first scroll spring mechanism 28 comprises a first scroll spring 16, a first ratchet-gear wheel 17, a first ratchet 25 and a first hydraulic cylinder 23, wherein the first scroll spring mechanism 28 is secured by a first scroll spring mechanism support 43; a piston rod of the first hydraulic cylinder 23 is hinged with the first ratchet 25 (without pressure, the piston rod of the first hydraulic cylinder extends out, with pressure, the piston rod of the first hydraulic cylinder retracts), the first ratchet 25 is fitted with the first ratchet-gear wheel 17, the first ratchet-gear wheel 17 is connected to the first scroll spring 16 via the first scroll spring mechanism output shaft 46, and an outer ring of the first scroll spring 16 is connected to the first scroll spring mechanism output plate 42; the first ratchet-gear wheel 17, the first scroll spring mechanism output shaft 46, and the first scroll spring mechanism output plate 42 are rigidly connected with one another.

The second scroll spring mechanism 29 comprises a second scroll spring 35, a second ratchet-gear wheel 34, a second ratchet 33, and a second hydraulic cylinder 32, wherein the second scroll spring mechanism 29 is secured by the second scroll spring mechanism support 45; the piston rod of the second hydraulic cylinder 32 is hinged with the second ratchet 33 (without pressure, the piston rod of the second hydraulic cylinder extends out; with pressure, the piston rod of the second hydraulic cylinder retracts), the second ratchet 33 is fitted with the second ratchet-gear wheel 34, the second ratchet-gear wheel 34 is connected with the second scroll spring 35 via the second scroll spring mechanism output shaft 47, and an outer ring of the second scroll spring 35 is connected with the second scroll spring mechanism output plate 44; the second ratchet-gear wheel 34, the second scroll spring mechanism output plate 44, and the second scroll spring mechanism output shaft 47 are rigidly connected with one another.

An oil inlet 11 and an oil outlet 12 are disposed on the cylinder barrel, the oil inlet 11 and the oil outlet 12 being disposed between the separation barrier 6 and the elastic mobile device, wherein the oil inlet 11 is connected with the oil tank 27 via an oil circuit, the oil outlet 12 is connected with the hydraulic motor oil inlet 37, the first hydraulic cylinder 23, and the second hydraulic cylinder 32 via two branched oil circuits, respectively, and the hydraulic motor 24 is also connected with the oil tank 27 via the hydraulic motor oil outlet 36. An oil-in unidirectional valve 15 is arranged on an oil circuit connecting the oil inlet 11 and the oil tank 27, preventing the hydraulic oil from flowing back; and an oil-out unidirectional valve 38 is provided on a branched oil circuit connecting the oil outlet 12 and the hydraulic motor oil inlet 37.

The first scroll spring mechanism 28 is in transmission connection with the differential planetary train of gearings 20 via a train of gearings, wherein the train of gearings include a magneto dynamic input pinion 18 and a magneto dynamic input gear wheel 19 which are engaged with each other; the first scroll spring mechanism output shaft 46 is in through connection with the first scroll spring 16 and then in transmission connection with the magneto dynamic input pinion 18, the magneto dynamic input pinion 18 being engaged with the magneto dynamic input gear wheel 19, and the magneto dynamic input gear wheel 19 being rigidly connected to a planetary carrier of the differential planetary train of gearings 20. The second scroll spring mechanism output shaft 47 is in through connection with the second scroll spring 35 and is then in rigid connection with a central gear of the differential planetary train of gearings 20; the first scroll spring mechanism output shaft 46 and the second scroll spring mechanism output shaft 47 are connected to the fly wheel input shaft 40 via the differential planetary train of gearings 20; the fly wheel input shaft 40 is rigidly connected to the fly wheel 21, the fly wheel 21 being connected by the unidirectional bearing 39 to the generator input shaft 41 via the coupling 30. The fly wheel 21 can only rotate upon rotation of the fly wheel input shaft 40, such that it will not occur that the fly wheel 21 drives the fly wheel input shaft 40 to rotate; in this way, by unidirectional rotation via the unidirectional bearing 39, stable energy output will be guaranteed.

Embodiment 2

A multi-buffer energy accumulation apparatus has a structure similar to Embodiment 1, except that the first scroll spring mechanism 28 is in transmission connection with the differential planetary train of gearings 20 via a sprocket and chain mechanism (not shown).

Specifically, the sprocket is in rigid connection with a planetary carrier of the differential planetary train of gearings 20, and the first scroll spring mechanism output shaft 46 is in transmission connection with the sprocket via the chain, wherein one end of the second scroll spring mechanism output shaft 47, and the other end thereof is through the sprocket and then rigidly connected to a central gear of the differential planetary train of gearings 20.

Embodiment 3

A multi-buffer energy accumulation apparatus has a structure similar to Embodiment 2, except that the first scroll spring mechanism 28 is in transmission connection with the differential planetary train of gearings 20 via a belt and band wheel mechanism (not shown).

Specifically, the band wheel is in rigid connection with a planetary carrier of the differential planetary train of gearings 20, and the first scroll spring mechanism output shaft 46 is in transmission connection with the band wheel via the belt, wherein one end of the second scroll spring mechanism output shaft 47 is in through connection with the second scroll spring 35, and the other end thereof is through the band wheel and then rigidly connected to the central gear of the differential planetary train of gearings 20.

Embodiment 4

A working method for the multi-buffer energy accumulation apparatus of embodiment 1 comprises steps below:

when an impact object contacts a piston rod head 31, the piston rod 1 moves and drives the piston 13 to move, and the piston 13 extrudes hydraulic oil, causing the hydraulic oil to generate a pressure and meanwhile the reset spring 4 to be compressed; the hydraulic oil with pressure controls, through a branched oil circuit of the oil outlet 12, a first hydraulic cylinder 23 and a second hydraulic cylinder 32 of the first scroll spring mechanism and the second scroll spring mechanism, causing a piston rod of the first hydraulic cylinder 23 and a piston rod of the second hydraulic cylinder 32 to retract, retraction of the piston rod of the first hydraulic cylinder 23 and the piston rod of the second hydraulic cylinder 32 meanwhile driving a first ratchet 25 and a second ratchet 33 to rotate, causing the first ratchet 25 and the second ratchet 33 to catch the first ratchet-gear wheel 17 and the second ratchet-gear wheel 34, respectively;

during the piston permanent-magnet 5 on the piston 13 is gradually approaching the cylinder bottom permanent-magnet 7, under an action of same magnetic polarity repulsion, the magneto dynamic output shaft 8 rotates and drives the first scroll spring mechanism to start energy accumulation; the hydraulic oil is compressed by the piston 13 and flows into the hydraulic motor 24 through the oil outlet 12, driving the hydraulic motor 24 to rotate, and the hydraulic motor 24 drives the second scroll spring mechanism to start energy accumulation;

after impact from the piston rod head 31 disappears, the first hydraulic cylinder 23 and the second hydraulic cylinder 32 of the first scroll spring mechanism and the second scroll spring mechanism are free from an action of the hydraulic oil, such that the piston rod of the first hydraulic cylinder 23 and the piston rod of the second hydraulic cylinder 32 extend out, causing the first ratchet 25 and the second ratchet 33 to rotate to release the first ratchet-gear wheel 17 and the second ratchet-gear wheel 34, such that the first scroll spring 16 and the second scroll spring 35 of the first scroll spring mechanism 28 and the second scroll spring mechanism 29 release the stored energy; the first scroll spring mechanism 28 transmits the energy to the first ratchet-gear wheel 17 via the first scroll spring mechanism output plate 42, causing the first ratchet-gear wheel 17 to rotate, and the second scroll spring mechanism 29 transmits energy to the second ratchet-gear wheel 34 via the second scroll spring mechanism output plate 44, causing the second ratchet-gear wheel 34 to rotate, such that the first ratchet-gear wheel 17, while rotating, drives the engaged magneto dynamic input pinion 18 and the magneto dynamic input gear wheel 19 to rotate and transmit the energy to the differential planetary train of gearings 20 via the magneto dynamic input gear wheel 19, and the second ratchet-gear wheel 34, while rotating, transmits the energy to the differential planetary train of gearings 20 via the second scroll spring mechanism output shaft 47; finally the energy is transmitted by the differential planetary train of gearings 20 via the fly wheel 21 to the generator 26 to run for power generation.

What is claimed is:

1. A multi-buffer energy accumulation apparatus, comprising: an energy storage cylinder, an oil tank, a first scroll spring mechanism, a second scroll spring mechanism, a hydraulic motor, a differential planetary train of gearings, and a generator;

the energy storage cylinder comprises a hermetically sealed cylinder body, one end of the hermetically sealed cylinder body being provided with a mobile device, the other end thereof being provided with an energy transmission device, and hydraulic oil is filled in the hermetically sealed cylinder body between the mobile device and the energy transmission device;

the hermetically sealed cylinder body, the hydraulic motor, and the oil tank are connected via an oil circuit to form a hydraulic loop; the energy transmission device is connected with the first scroll spring mechanism; the hydraulic motor is connected with the second scroll spring mechanism, wherein the first scroll spring mechanism and the second scroll spring mechanism are connected to the generator via the differential planetary train of gearings.

2. The multi-buffer energy accumulation apparatus according to claim 1, wherein the mobile device comprises, a piston rod, a piston rod head, a reset spring, a piston, a magnet wheel, and a piston permanent-magnet, wherein the piston is arranged in the hermetically sealed cylinder body, the magnet wheel is disposed inside the piston and is connected to one end of the piston rod; the piston permanent-magnet is arranged on a circumferential direction of the magnet wheel; other end of the piston rod is extended outside of the hermetically sealed cylinder body and the reset spring successively and then connected with the piston rod head.

3. The multi-buffer energy accumulation apparatus according to claim 2, wherein the energy transmission device comprises a magneto dynamic output shaft, a cylinder bottom permanent-magnet, and a separation barrier, wherein one end of the magneto dynamic output shaft are arranged inside the hermetically sealed cylinder body, the cylinder bottom permanent-magnet is arranged on a circumferential direction of the magneto dynamic output shaft, the other end of the magneto dynamic output shaft passes out the hermetically sealed cylinder body, the separation barrier is disposed inside the hermetically sealed cylinder body and between the energy transmission device and the mobile device, and opposite sides of the cylinder bottom permanent-magnet and the piston permanent-magnet have a same polarity.

4. The multi-buffer energy accumulation apparatus according to claim 3, wherein the piston permanent-magnet is disposed to tilt upwardly with an included angle on a circumferential direction of the magnet wheel; and the cylinder bottom permanent-magnet is disposed to tilt upwardly with an included angle on a circumferential direction of the magneto dynamic output shaft, wherein the included angle of the piston permanent-magnet is identical to that of the cylinder bottom permanent-magnet.

5. The multi-buffer energy accumulation apparatus according to claim 1, wherein the first scroll spring mechanism and the differential planetary train of gearings are connected via a train of gearings, a sprocket mechanism or a band wheel mechanism.

6. The multi-buffer energy accumulation apparatus according to claim 3, wherein the first scroll spring mechanism and the second scroll spring mechanism both comprise a scroll spring, a ratchet wheel, a ratchet, and a hydraulic cylinder, wherein a piston rod of the hydraulic cylinder is hinged with the ratchet, the ratchet is fitted with the ratchet wheel, and the ratchet wheel and the scroll spring are connected via a shaft.

7. The multi-buffer energy accumulation apparatus according to claim 1, wherein the multi-buffer energy accumulation device further comprises a fly wheel via which the differential planetary train of gearings is connected with the generator.

8. The multi-buffer energy accumulation apparatus according to claim 6, wherein the hermetically sealed cylinder body is provided with an oil inlet and an oil outlet, the oil inlet and the oil outlet being disposed between the separation barrier and the mobile device, wherein the oil inlet is connected to the oil tank via the oil circuit, and the oil outlet being connected to the hydraulic motor and the hydraulic cylinder via two branched oil circuits, respectively.

9. The multi-buffer energy accumulation apparatus according to claim 8, wherein an oil-in unidirectional valve is disposed on an oil circuit connecting the oil inlet with the oil tank, and an oil-out unidirectional valve is disposed on a branched oil circuit connecting the oil outlet and the hydraulic motor.

10. A working method for the multi-buffer energy accumulation apparatus according to claim 1, comprising steps of:

when an impact object contacts a piston rod head, the piston rod moves and drives a piston to move, the piston extrudes hydraulic oil, causing the hydraulic oil to generate a pressure and meanwhile a reset spring to be compressed; the hydraulic oil with pressure controls, through a branched oil circuit of the oil outlet, hydraulic cylinders of a first scroll spring mechanism and a second scroll spring mechanism, which results in retracting of hydraulic cylinder piston rods of the first scroll spring mechanism and the second scroll spring mechanism, and the hydraulic cylinder piston rods retracting and driving a ratchet to rotate, causing the ratchet to catch a ratchet wheel;

when the piston permanent-magnet on the piston is gradually approaching a cylinder bottom permanent-magnet under an action of same magnetic polarity repulsion, a magneto dynamic output shaft rotates and drives the first scroll spring mechanism to start energy accumulation; the hydraulic oil is compressed by the piston and flows into a hydraulic motor through an oil outlet, driving the hydraulic motor to rotate, and the hydraulic motor drives the second scroll spring mechanism to start energy accumulation;

after impact of the piston rod head, the hydraulic cylinders of the first scroll spring mechanism and the second scroll spring mechanism have no the hydraulic oil, which causes piston rods of the hydraulic cylinders extend out, causing the ratchet to rotate to release the ratchet wheel, scroll springs of the first scroll spring mechanism and the second scroll spring mechanism release the accumulated energy, the energy being outputted by the first scroll spring mechanism and the second scroll spring mechanism to a fly wheel via a differential planetary train of gearings and finally outputted to a generator via the fly wheel.

\* \* \* \* \*